C. L. PARKER.
ELEVATOR FOR SUCKER RODS.
APPLICATION FILED JULY 9, 1912.
1,072,360.
Patented Sept. 2, 1913.
2 SHEETS—SHEET 1.
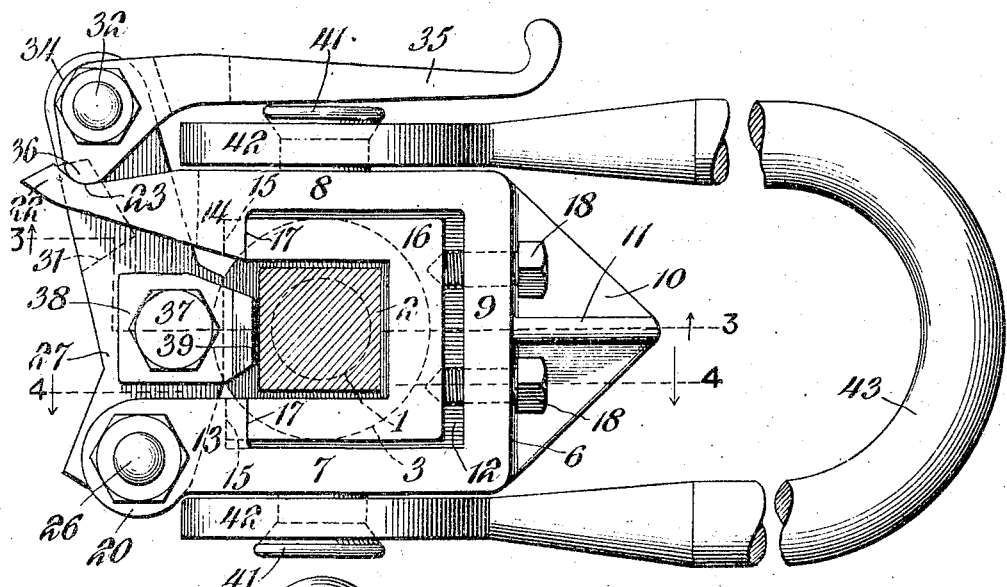
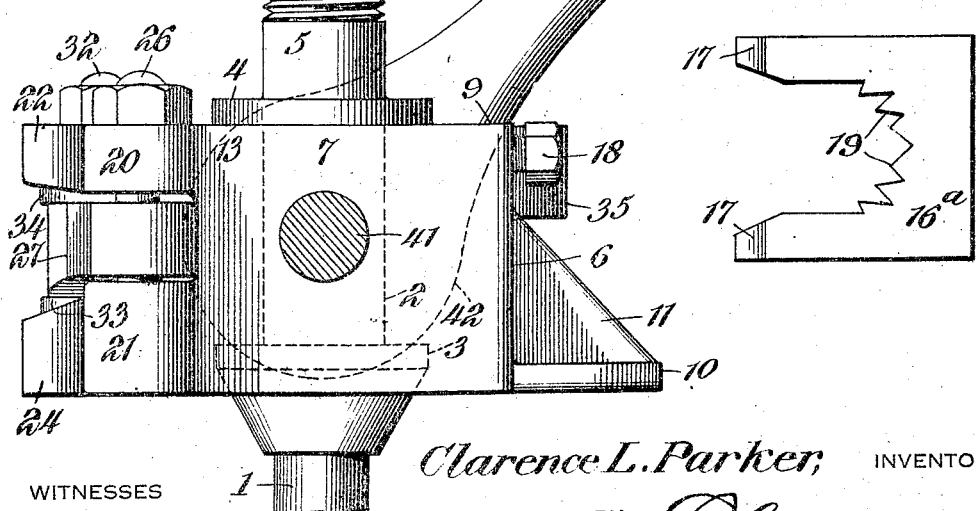
WITNESSES
Howard D. Orr.
F. T. Chapman.
Clarence L. Parker, INVENTOR,
BY
E. G. Siggers
ATTORNEY C. L. PARKER.
ELEVATOR FOR SUCKER RODS.
APPLICATION FILED JULY 9, 1912.
1,072,360.
Patented Sept. 2, 1913.
2 SHEETS—SHEET 2.
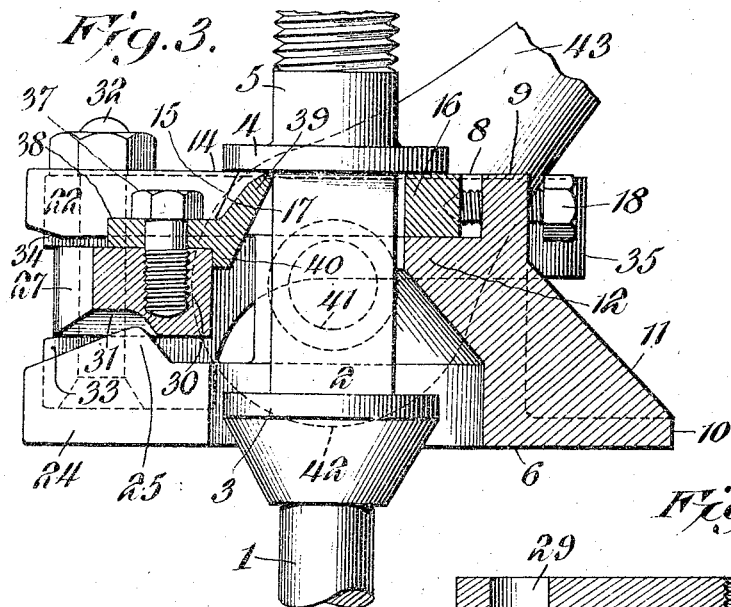
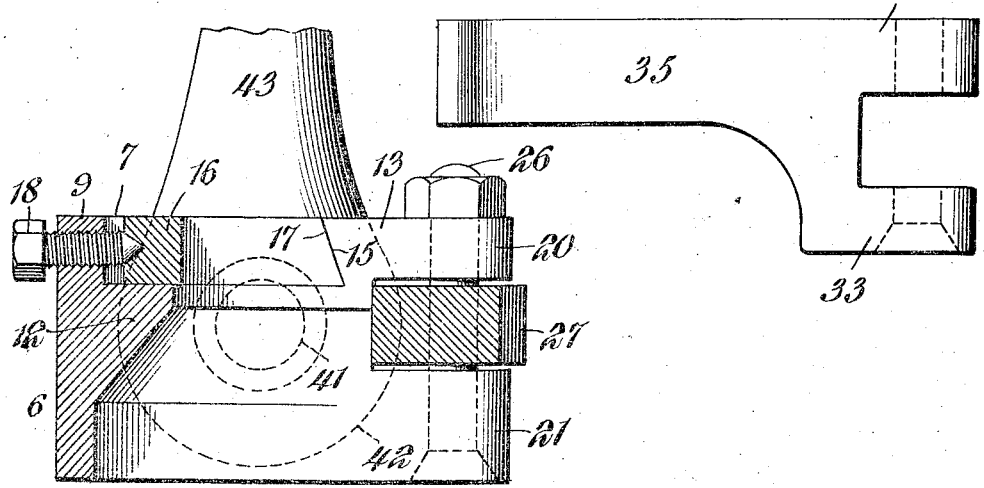
Clarence L. Parker, INVENTOR,
WITNESSES
BY
ATTORNEY

UNITED STATES PATENT OFFICE.

CLARENCE LYMAN PARKER, OF LOS ANGELES, CALIFORNIA.

ELEVATOR FOR SUCKER-RODS.

1,072,360.

Specification of Letters Patent.

Patented Sept. 2, 1913.

Application filed July 9, 1912. Serial No. 708,456.

*To all whom it may concern:*

Be it known that I, CLARENCE L. PARKER, a citizen of the United States, residing at Los Angeles, in the county of Los Angeles and State of California, have invented a new and useful Elevator for Sucker-Rods, of which the following is a specification.

This invention has reference to improvements in elevators for deep well sucker rods, and its object is to provide a device for the purpose into which the sucker rod may be readily placed, and upon which sucker rod the device may close in a manner to hold the rod firmly in place against possibility of displacement.

The invention comprises what may be termed a solid back yoke in which is lodged a sucker rod seat, and which carries a gate whereby the sucker rod may be locked to its seat by the closing of the gate in a manner preventing displacement and resisting the heavy strains to which the device is put.

The invention will be best understood from a consideration of the following detailed description taken in connection with the accompanying drawings forming a part of this specification, with the further understanding that while the drawings illustrate a practical form of the invention it is susceptible of other practical embodiments, wherefore the invention is not confined to any strict conformity with the showing of the drawings, but may be changed and modified so long as the changes do not mark any material departure from the salient features of the invention.

In the drawings:—Figure 1 is a plan view of the sucker rod elevator, the latter being shown in cross section through the wrenching portion of the sucker rod. Fig. 2 is a side elevation of the structure of Fig. 1 with one of the bail receiving trunnions shown in section and the corresponding portion of the bail omitted. Fig. 3 is a section on the line 3—3 of Fig. 1 with the sucker rod shown in elevation. Fig. 4 is a section on the line 4—4 of Fig. 1. Fig. 5 is a longitudinal section through a gate used in connection with the present device. Fig. 6 is an elevation of the gate tightening lever. Fig. 7 is a plan view of a modified form of sucker rod seat.

Referring to the drawings, there is shown a sucker rod 1 having a terminal portion 2 of rectangular cross section with flanges 3, 4 at the opposite ends, and a continuation 5 terminating in screw threads designed to enter a suitable coupling for connecting one sucker rod section to another. The sucker rod described may be taken as an example of any suitable sucker rod and not as limiting the invention to the particular form of sucker rod illustrated.

The sucker rods of deep well pumps are made up of numerous comparatively short sections connected together at the ends by screw couplings, and these rods are inserted in the well length by length, or withdrawn from the well in like manner.

The elevator comprises a body portion 6 which may be in the form of a generally rectangular yoke having side walls 7, 8, respectively, and a connecting wall 9 which may be appropriately strengthened by webs 10, 11. Opposite the wall 9 the yoke is open, while on the inner faces of the walls 7, 8 and 9 there is formed an inwardly directed flange or ledge 12, the ledge terminating adjacent the free ends of the side walls 7 and 8 in uprising enlargements 13, 14, respectively, which are undercut, as shown at 15, toward the rear wall and adapted to the ledge 12 and the under cut portions 15 is a substantially three-sided approximately rectangular sucker rod seat 16 having the free ends of the side portions beveled, as indicated at 17, to engage the under cut portions 15, while extending through the rear wall 9 above the ledge 12 thereof are set screws 18 adapted to engage the corresponding portion of the seat frame 16 to bind the beveled portions 17 to the under cut parts 15. The seat 16 is so proportioned to the ledge 12 that on loosening the screws 18 the seat may be readily removed and another substituted, such a substitute seat 16ª being indicated in Fig. 7.

In Fig. 1 and associated figures the seat 16 has its interior shaped to receive the rectangular portion 2 of the sucker rod terminal, while in Fig 7 the seat 16ª has interior teeth 19 formed similar to the teeth of a pipe wrench or pipe engaging jaw, so that the seat 16ª is adapted to grip round portions of sucker rods instead of square or other rectangular parts. The parts of the yoke supporting the seat 16 or 16ª form a sunken receptacle for such seat, so that the upper surface of the seat may be about flush with the top of the yoke.

The end of the side 7 formed with the boss 13 is continued into an ear 20 at the upper portion and into another ear 21 near the lower portion, the two ears being spaced one from the other. That end of the side 8 provided with the boss 14 is elongated, as indicated at 22, and on the outer face formed with a shallow notch 23, this structure being on the upper portion of the side member 8, while the lower portion is formed with a prolongation 24 spaced from the prolongation 22, and on the face toward the said last named prolongation the part 24 is thickened, as indicated at 25, to constitute a rather blunt tooth.

Traversing the ears 20 and 21 is a pintle 26 in the form of a bolt, and carried by this pintle is one end of a gate 27 of elongated contour and defining an obtuse angle longitudinally. This gate is provided near one end with a passage 28 for the pintle 26, and near the other end with another passage 29, while adjacent the intermediate angle there is provided a threaded socket 30 and in the face of the gate which in practice constitutes its lower face there is a notch or recess 31 of a shape to receive the tooth 25 under circumstances to be described. The passage 29 of the gate 27 is designed to receive a pivot 32 which may be in the form of a bolt, which pivot traverses ears 33, 34 so formed on one end of a lever 35 as to straddle the end of the gate provided with a passage 29. The ear 34 is formed with an angle extension 36, so situated as to engage the notch 23 under circumstances to be described, and it is evident that both ears 33 and 34 may have angle extensions 36 and the prolongations 23 and 24 may both be formed to receive these angle extensions.

The threaded socket 30 is designed to receive a set screw 37 securing to the gate a plate 38 having at one end a tooth 39 extending beyond one face of the plate at a slight angle thereto, while a lug 40 on the other face of the plate is so disposed as to engage the corresponding edge of the gate when the plate 38 is secured to the gate by the screw 37.

On the outer faces of the sides 7 and 8 of the yoke 6 are pins or trunnions 41 designed to traverse eyes 42 formed on the respective ends of a bail or link 43 to which the elevator rope or cable is secured, it being customary to provide the wells with a derrick and suitable pulleys and other means, whereby the elevator rope may be manipulated as may be found desirable.

When the elevator is in position to receive a sucker rod, the lever 35 is moved in a direction to carry the end 36 out of the notch 23 and then the gate is swung on the pintle or pivot 26 until the open sides of the yoke and seat 16 or 16ª lodged therein are entirely free. The sucker rod is now introduced and in the case of the yoke 16, the flange 4 is so placed as to rest on top of the seat. This may be readily accomplished since the entering side of the elevator for the sucker rod is wholly free and open. Now the gate is swung around into place in traversing relation to the open side of the yoke, and the gate is slightly elevated by riding up the tooth 25 which has an inclined outer face to facilitate such action, and ultimately the tooth 25 will enter the recess 31, while the tooth 39 engages under the flange 4 and as the latter moves on to the seat 16 the gate is forced downwardly until the tooth 25 has so entered the recess 31 that the gate cannot again move outwardly until the pressure is relieved. In order to secure the free end of the gate in locked relation to the yoke 6 the lever 35 is manipulated, so that its shorter end or ends 36 enter the recess or recesses 23, thereby locking the lever in position against liability of accidental displacement, but at the same time offering no material resistance to the designed movement of the lever to unlocking position.

Where it is desirable to utilize the elevator for round portions of rods instead of square or rectangular portions of rods, it is a simple matter to loosen the set screws 18 and substitute the seat 16ª or other appropriate seat for the seat 16, when the device will operate as before. In this construction the lever 35 is not depended upon to hold the gate in place, for it is accomplished by the tooth 25 engaging in the notch or recess 31 of the gate, which gate is held in such position by the weight of the sucker rod in engagement with the tooth 39. The lever 35, however, acts as a connecting member in conjunction with the gate between the free ends of the side members 7 and 8 of the open ended yoke frame, so that when the device is in operation the frame becomes as it were a closed frame with no portions liable to spring apart and either be broken or otherwise permit the sucker rod to escape. The solid back yoke or main frame of the elevator provides a strong and comparatively unyielding member receiving the direct weight of the sucker rod and provides direct connection for the lifting bail or link.

What is claimed is:—

1. A sucker rod elevator comprising a frame or yoke open at one side and of a size to wholly contain a sucker rod moved into the yoke through the open side, the members of the yoke being in fixed relation one to the other, a gate for the open side of the yoke hinged thereto and movable to close the open side, the yoke and gate having coacting means for locking the gate in the closed position, and said gate being of less height than the yoke at the open side of the latter, and means carried by the gate in upstanding relation thereto for engaging a sucker rod lodged in the yoke to hold the gate in the locked position by the weight of the sucker rod.

2. In a sucker rod elevator, a frame or yoke open at one side to an extent to receive a sucker rod through said open side, a gate pivoted at one end to the yoke and movable into transverse relation to the open side of the yoke, a tightening lever carried by the end of the gate remote from the pivot end, and means on the gate movable into engaging relation to a sucker rod lodged in the yoke to be engaged by said sucker rod under the action of the weight of the sucker rod, the gate and yoke being provided with coacting means for locking the gate to the yoke by the action of the weight of the sucker rod and the tightening lever and yoke being provided with coacting means for resisting spreading action of the open end of the yoke.

3. In an elevator for sucker rods, a yoke constituting the frame of the elevator and of a size to wholly receive a sucker rod, said yoke having one side open to an extent to receive the sucker rod and also having its members in fixed relation one to the other, and a one-piece seat for the sucker rod adapted to the yoke and provided with an open side matching that of the yoke, the yoke being formed with a sunken receptacle for the seat and said seat being removably and replaceably mounted in said receptacle in the yoke, and said yoke and seat being provided with coacting locking means for holding the seat on the yoke with the open sides matching.

4. In an elevator for sucker rods, an open sided yoke constituting the frame of the elevator, and a removable seat for the sucker rod adapted to the yoke, said seat having one side open to correspond to the open side of the yoke, the yoke being provided with a supporting ledge for the seat and with under-cut portions, and the seat being provided with beveled ends adapted to the under-cut portions, the yoke being also provided with means for holding the seat in removable locked relation to the yoke.

5. In an elevator for sucker rods, an unbroken yoke having one side open to an extent to receive a sucker rod therethrough, a gate movable into and out of traversing relation to the open side of the yoke, and means for causing the locking of the gate in the closed position by the weight of the sucker rod, said means comprising a tooth formed on the yoke in position to enter a recess formed in the gate, and said gate being provided with a tooth in position to be engaged by the sucker rod to hold the first named tooth in the said recess.

6. In an elevator for sucker rods, an unbroken yoke having one side open to an extent to receive a sucker rod therethrough, a gate movable into and out of traversing relation to the open side of the yoke, and means for causing the locking of the gate in the closed position by the weight of the sucker rod, said means comprising a tooth formed on the yoke in position to enter a recess formed in the gate, and said gate being provided with a tooth in position to be engaged by the sucker rod to hold the first named tooth in the said recess, and said gate and yoke being provided with coacting means resistant to spreading action of the free ends of the open sided portion of the yoke.

7. In an elevator for sucker rods, a yoke adapted to receive a sucker rod and having one side open to an extent to permit the passage of the sucker rod into the yoke, a removable seat for the sucker rod adapted to be carried by the yoke, a gate pivotally supported at one end to one side of the open sided portion of the yoke and having an extent of movement longitudinal of its pivot, said gate being also provided with a recess on one face and the yoke being provided with a tooth on the side of the open end of the yoke remote from that to which the gate is pivoted, a lever carried by the free end of the gate in position to engage and lock with the corresponding end of the yoke when the gate is closed, and a tooth carried by an intermediate portion of the gate in position to be engaged by a sucker rod when in the yoke to force the gate into locking relation to the tooth of the yoke.

In testimony that I claim the foregoing as my own, I have hereto affixed my signature in the presence of two witnesses.

CLARENCE LYMAN PARKER.

Witnesses:
 FRANK D. EUSTIS,
 ROBERT I. EUSTIS.